(12) United States Patent
Chou et al.

(10) Patent No.: US 12,513,358 B2
(45) Date of Patent: Dec. 30, 2025

(54) SETUP METHOD OF DISPLAY DEVICE (71) Applicant: Realtek Semiconductor Corporation, Hsinchu (TW)

(72) Inventors: Kai-Hsiang Chou, Hsinchu (TW); Cheng Yu Yen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 18/650,093

(22) Filed: Apr. 30, 2024

(65) Prior Publication Data

US 2025/0142163 A1 May 1, 2025

(30) Foreign Application Priority Data

Oct. 26, 2023 (TW) ................... 112141116

(51) Int. Cl.
| | | |
|---|---|---|
| *H04N 21/438* | (2011.01) | |
| *H04N 21/422* | (2011.01) | |
| *H04N 21/4363* | (2011.01) | |
| *H04N 21/443* | (2011.01) | |
| *H04N 21/45* | (2011.01) | |
| *H04N 21/458* | (2011.01) | |
| *H04N 21/485* | (2011.01) | |

(52) U.S. Cl.
CPC . *H04N 21/43635* (2013.01); *H04N 21/42204* (2013.01); *H04N 21/438* (2013.01); *H04N 21/443* (2013.01); *H04N 21/4516* (2013.01); *H04N 21/4518* (2020.08); *H04N 21/4586* (2013.01); *H04N 21/485* (2013.01)

(58) Field of Classification Search
CPC ......... H04N 21/43635; H04N 21/4518; H04N 21/42204; H04N 21/438; H04N 21/443; H04N 21/4516; H04N 21/4586; H04N 21/485
USPC .......................................................... 725/37
See application file for complete search history.

(56) References Cited

U.S. PATENT DOCUMENTS

| | | | |
|---|---|---|---|
| 10,964,203 B1 | 3/2021 | Fiaux et al. | |
| 2006/0269056 A1* | 11/2006 | Montag ................ | H04N 7/1675 348/E7.055 |
| 2009/0046999 A1* | 2/2009 | Park ...................... | H04N 5/765 386/332 |
| 2009/0162029 A1* | 6/2009 | Glen ...................... | H04N 21/47 386/231 |

(Continued)

FOREIGN PATENT DOCUMENTS

| | | |
|---|---|---|
| CN | 102024444 A | 4/2011 |
| CN | 104040478 B | 11/2017 |

(Continued)

*Primary Examiner* — Nasser M Goodarzi
(74) *Attorney, Agent, or Firm* — CKC & Partners Co., LLC (57) ABSTRACT

A setup method of a display device includes the following steps. A remote control device transmits a setting command to a smart device through a transmission interface. The smart device converts the setting command into a display setting command. The smart device transmits the display setting command to the display device, in which a first connector of the smart device is physically connected to a second connector of the display device. The display device correspondingly performs a firmware update operation or correspondingly adjusts at least one parameter of the display device according to the display setting command.

18 Claims, 7 Drawing Sheets

(56) References Cited

U.S. PATENT DOCUMENTS

| | | | |
|---|---|---|---|
| 2009/0207307 A1* | 8/2009 | Tsuru | H04N 21/4122 348/E5.062 |
| 2010/0214212 A1* | 8/2010 | Chen | G06F 3/023 345/156 |
| 2010/0245367 A1* | 9/2010 | Weng | G06F 8/65 345/520 |
| 2013/0285894 A1* | 10/2013 | Marti | G06V 40/28 345/156 |
| 2014/0009501 A1 | 1/2014 | Kim et al. | |
| 2014/0222862 A1 | 8/2014 | Arling et al. | |
| 2017/0010654 A1* | 1/2017 | Chen | G06F 1/3265 |
| 2017/0257668 A1 | 9/2017 | Young et al. | |
| 2018/0091845 A1* | 3/2018 | Lee | H04N 21/43635 |
| 2018/0173592 A1* | 6/2018 | Heo | G06F 8/65 |
| 2019/0155364 A1 | 5/2019 | Chen | |
| 2021/0388979 A1* | 12/2021 | Maderic | H05B 47/19 |
| 2021/0392301 A1 | 12/2021 | Tong | |
| 2022/0400302 A1 | 12/2022 | Baker et al. | |
| 2023/0176852 A1* | 6/2023 | Senda | G05B 19/05 717/170 |
| 2024/0146996 A1* | 5/2024 | Shao | H04N 21/4221 |

FOREIGN PATENT DOCUMENTS

| | | |
|---|---|---|
| CN | 114968314 A | 8/2022 |
| CN | 116887382 A | 10/2023 |
| TW | 201338328 A | 9/2013 |
| TW | 201613360 A | 4/2016 |
| TW | 201902228 A | 1/2019 |
| TW | 202209091 A | 3/2022 |
| TW | 202318187 A | 5/2023 |

\* cited by examiner

SETUP METHOD OF DISPLAY DEVICE

RELATED APPLICATIONS

This application claims priority to Taiwan Application Serial Number 112141116, filed Oct. 26, 2023, the disclosure of which is incorporated herein by reference in its entirety.

BACKGROUND

Field of Invention

The present invention relates to a setup method of a display device. More particularly, the present invention relates to a setup method of a display device that transmits a display setting command through a Display Data Channel (DDC) and in compliance with a Video Electronics Standards Association (VESA) Monitor Control Command Set (MCCS) standard.

Description of Related Art

Currently, the firmware updating operation of the display device usually needs to be performed through the USB port of the display device. One way is that the user inserts a flash drive storing the updated version firmware into the USB port of the display device, and then the user clicks the corresponding item of On-Screen Display (OSD) menu on the display screen of the display device to perform the firmware updating operation. Another way is that the user connects an external computer to the USB port of the display device through a USB cable, and the updated version firmware is downloaded by the external computer, and then the external computer performs the firmware updating operation on the display device by issuing a specific command. However, if the display device does not have a reserved USB port, the display device needs be sent to the manufacturer's repairing center, such that the manufacturer's engineer performs the firmware updating operation, thereby causing inconvenience to the user and increasing time and cost. Therefore, there is a need to provide a solution for solving the above problems, and thus the users can conveniently update the firmware of the display device by themselves.

SUMMARY

The present invention provides a setup method of a display device includes the following steps. A remote control device transmits a setting command to a smart device through a transmission interface. The smart device converts the setting command into a display setting command. The smart device transmits the display setting command to the display device, in which a first connector of the smart device is physically connected to a second connector of the display device. The display device correspondingly performs a firmware update operation of the display device according to the display setting command.

The present invention further provides a setup method of a display device includes the following steps. A remote control device transmits a setting command to a smart device through a transmission interface. The smart device converts the setting command into a display setting command. The smart device transmits the display setting command to the display device, in which a first connector of the smart device is physically connected to a second connector of the display device. The display device correspondingly adjusts at least one parameter of the display device according to the display setting command.

The present invention yet provides a setup method of a display device includes the following steps. A remote control device transmits a setting command to a smart device through a transmission interface. The smart device converts the setting command into a display setting command. The smart device transmits the display setting command to the display device, in which a first connector of the smart device is physically connected to a second connector of the display device. The display device correspondingly performs a setting operation of the display device according to the display setting command. The remote control device completes pairing with the smart device through the display device, before the remote control device transmits the setting command, such that the display device becomes a private display device that can only be controlled by the remote control device.

In order to let above mention of the present invention and other objects, features, advantages, and embodiments of the present invention to be more easily understood, the description of the accompanying drawing as follows.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Specific embodiments of the present invention are further described in detail below with reference to the accompanying drawings, however, the embodiments described are not intended to limit the present invention and it is not intended for the description of operation to limit the order of implementation. The using of "first", "second", "third", etc. in the specification should be understood for identify units or data described by the same terminology, but are not referred to particular order or sequence.

Figure 1:
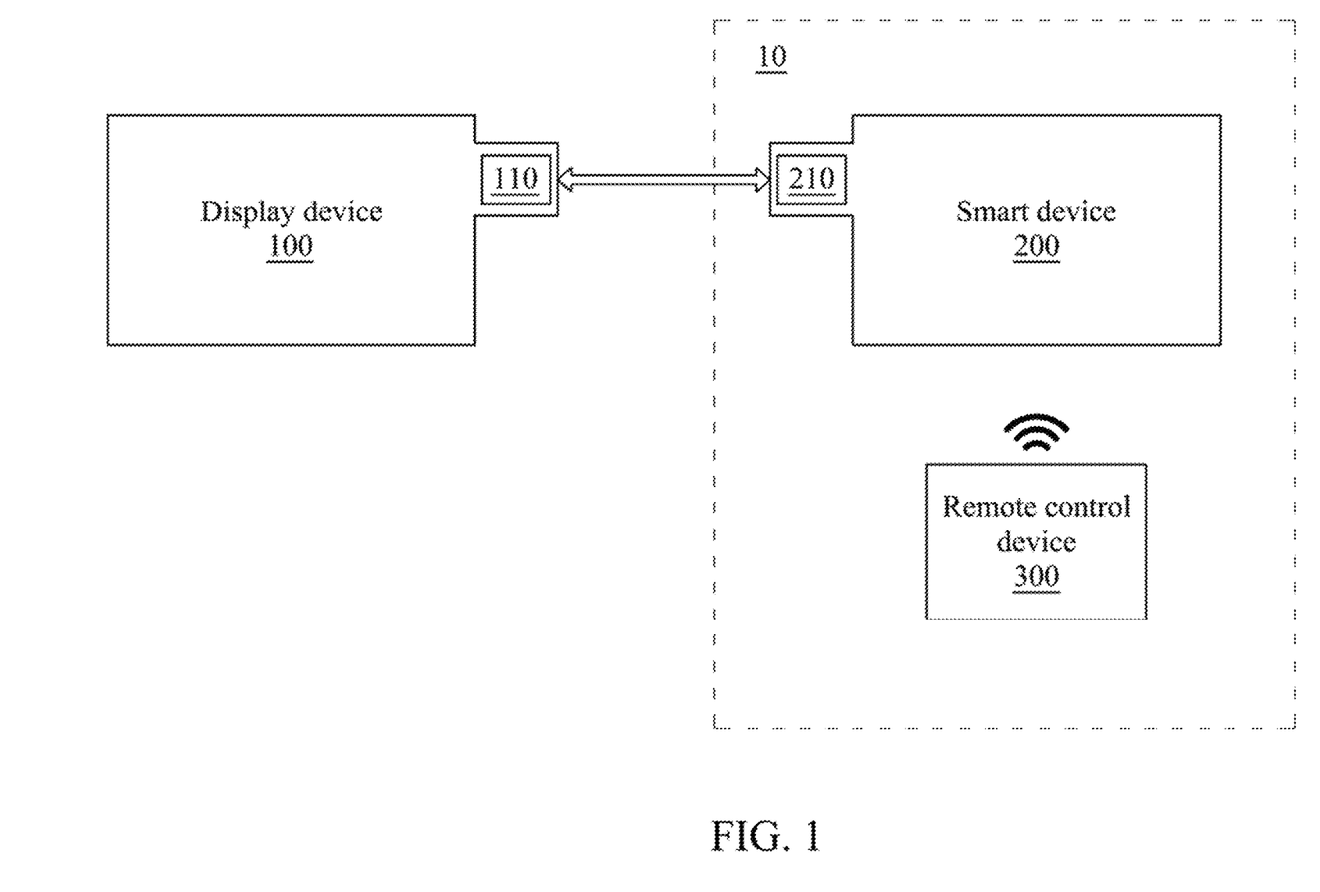
FIG. 1 illustrates a system block diagram of a system corresponding to a setup method of a display device according to some embodiments of the present invention.

FIG. 1 illustrates a system block diagram of a system 10 corresponding to a setup method of a display device 100 according to some embodiments of the present invention. The system 10 includes a smart device 200 and a remote control device 300. The system 10 is communicatively connected to the display device 100. In some embodiments of the present invention, the display device 100 may be a monitor or a television having a display screen. In some embodiments of the present invention, the smart device 200 is a digital video converting box (also known as a Set-Top Box (STB)) with internet networking capabilities, such as an OTT set-top box, a TV stick, a dongle, or a smart TV box, etc. The smart device 200 may receive digital audio-video content corresponding to the audio-video data through the internet.

As shown in FIG. 1, the remote control device 300 is communicatively connected to the smart device 200 pairing with the remote control device 300. In some embodiments of the present invention, the remote control device 300 is a mouse, a keyboard, a smart phone or a wireless remote controller, such that the remote control device 300 may manipulate the smart device 200. In some embodiments of the present invention, the remote control device 300 is communicatively connected to the smart device 200 through a transmission interface, such as but not limited to a Bluetooth interface, an infrared (IR) transmission interface, a universal serial bus (USB) interface or a wireless local area network (WLAN) interface. Specifically, in some embodiments of the present invention, the remote control device 300 transmits a setting command to the smart device 200 through the transmission interface. For example, when the remote control device 300 is the mouse or the keyboard, the remote control device 300 is communicatively connected to the smart device 200 through the Bluetooth interface, the IR transmission interface, or the USB interface. For example, when the remote control device 300 is the smart phone, the remote control device 300 is communicatively connected to the smart device 200 through the Bluetooth interface, the IR transmission interface, the USB interface, or the WLAN interface. For example, when the remote control device 300 is a Bluetooth remote controller, the remote control device 300 is communicatively connected to the smart device 200 through the Bluetooth interface. For example, when the remote control device 300 is an infrared (IR) remote controller, the remote control device 300 is communicatively connected to the smart device 200 through the IR interface. For example, when the remote control device 300 is a Wi-Fi remote controller, the remote control device 300 is communicatively connected to the smart device 200 through the WLAN interface.

As shown in FIG. 1, a connector 110 of the display device 100 is physically connected to a connector 210 of the smart device 200. For example, the connector 210 is a male connector physically connected to the connector 110 which is a female connector in a plug-in manner. For example, the connector 110 is physically connected to the connector 210 through cable interconnection. In some embodiments of the present invention, each of the connector 210 and the connector 110 includes a high definition multimedia interface (HDMI), but the present invention is not limited thereto. In another embodiment of the present invention, each of the connector 210 and the connector 110 includes a DisplayPort (DP) interface. In yet embodiment of the present invention, each of the connector 210 and the connector 110 includes a Universal Serial Bus Type-C (USB-C) interface.

Figure 2:
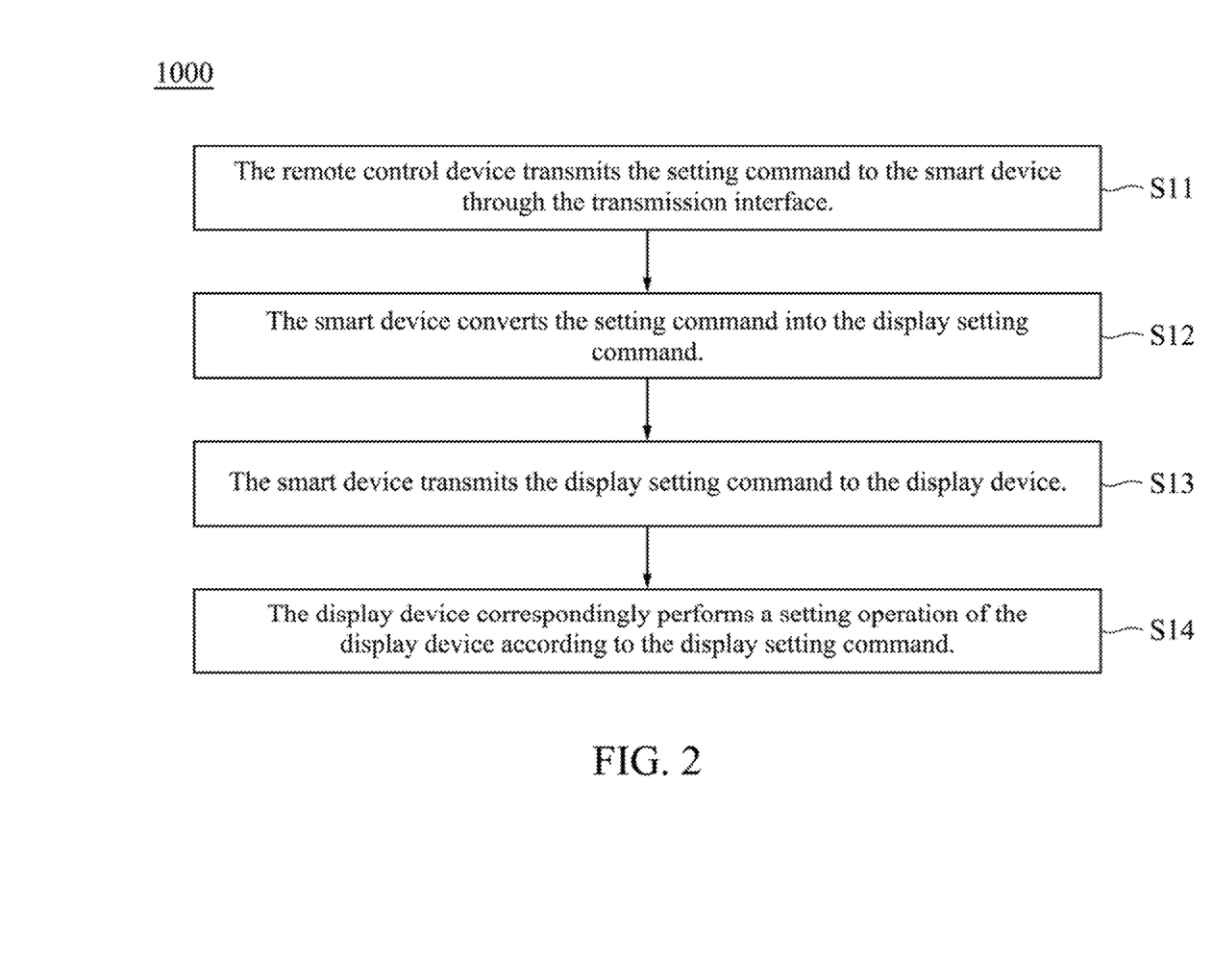
FIG. 2 illustrates a flow chart of a setup method of a display device according to a first embodiment of the present invention.

FIG. 2 illustrates a flow chart of a setup method 1000 of the display device 100 according to a first embodiment of the present invention. The setup method 1000 of the display device 100 includes steps S11, S12, S13, and S14. In the step S11, the remote control device 300 transmits the setting command to the smart device 200 through the transmission interface. In the step S12, the smart device 200 converts the setting command into a display setting command corresponding to the setting command. In the step S13, the smart device 200 transmits the display setting command to the display device 100. In the step S14, the display device 100 correspondingly performs a setting operation of the display device according to the display setting command.

In the first embodiment of the present invention, in the step S13, each of the connector 210 and the connector 110 includes the high definition multimedia interface (HDMI), and the smart device 200 transmits the display setting command to the display device 100 through a Display Data Channel (DDC). In detail, in the step S13, each of the connector 210 and the connector 110 includes the high definition multimedia interface (HDMI), and the smart device 200 transmits the display setting command to the display device 100 through the Display Data Channel (DDC) and in compliance with a Video Electronics Standards Association (VESA) Monitor Control Command Set (MCCS) standard. In other words, the display setting command transmitted from the smart device 200 to the display device 100 is a MCCS command, and specifically, in the step S12, the smart device 200 converts the setting command into the MCCS command. Specifically, the setting operation in the step S14 of embodiments of the present invention may actually support any function within various monitor control command set (MCCS) standard. The setting operation in the step S14 is to, such as but not limited to, adjust color temperature, saturation, HUE, brightness, contrast, volume, etc. For detailed setting operation, please refer to the "VESA Monitor Control Command Set Standard" documents of the VESA Association.

In the first embodiment of the present invention, in the step S14, the display device 100 correspondingly adjusts the parameter(s) of the display device 100 according to the display setting command. The aforementioned adjusted parameter of the display device 100 is essentially the parameter that can originally be adjusted through On-Screen Display (OSD). The aforementioned adjusted parameter(s) may include, for example but not limited to, brightness, contrast, volume, etc. In other words, the setting command transmitted by the remote control device 300 in the step S11 is related to the parameter(s) for adjusting the display device 100. In general, the button/keypress operations for adjusting parameter of traditional display device are quite cumbersome and require many steps to adjust one display parameter through On-Screen Display (OSD). In contrast, by utilizing the setup method 1000 of the first embodiment of the present invention, the user can adjust the display parameter(s) without using any hardware buttons of the display device 100 or operating On-Screen Display (OSD) on the display screen of the display device 100. On the other hand, by utilizing the setup method 1000 of the first embodiment of the present invention, the display device 100 does not need hardware buttons to be configured thereon, thereby reducing the production cost of the display device 100.

Figure 3:
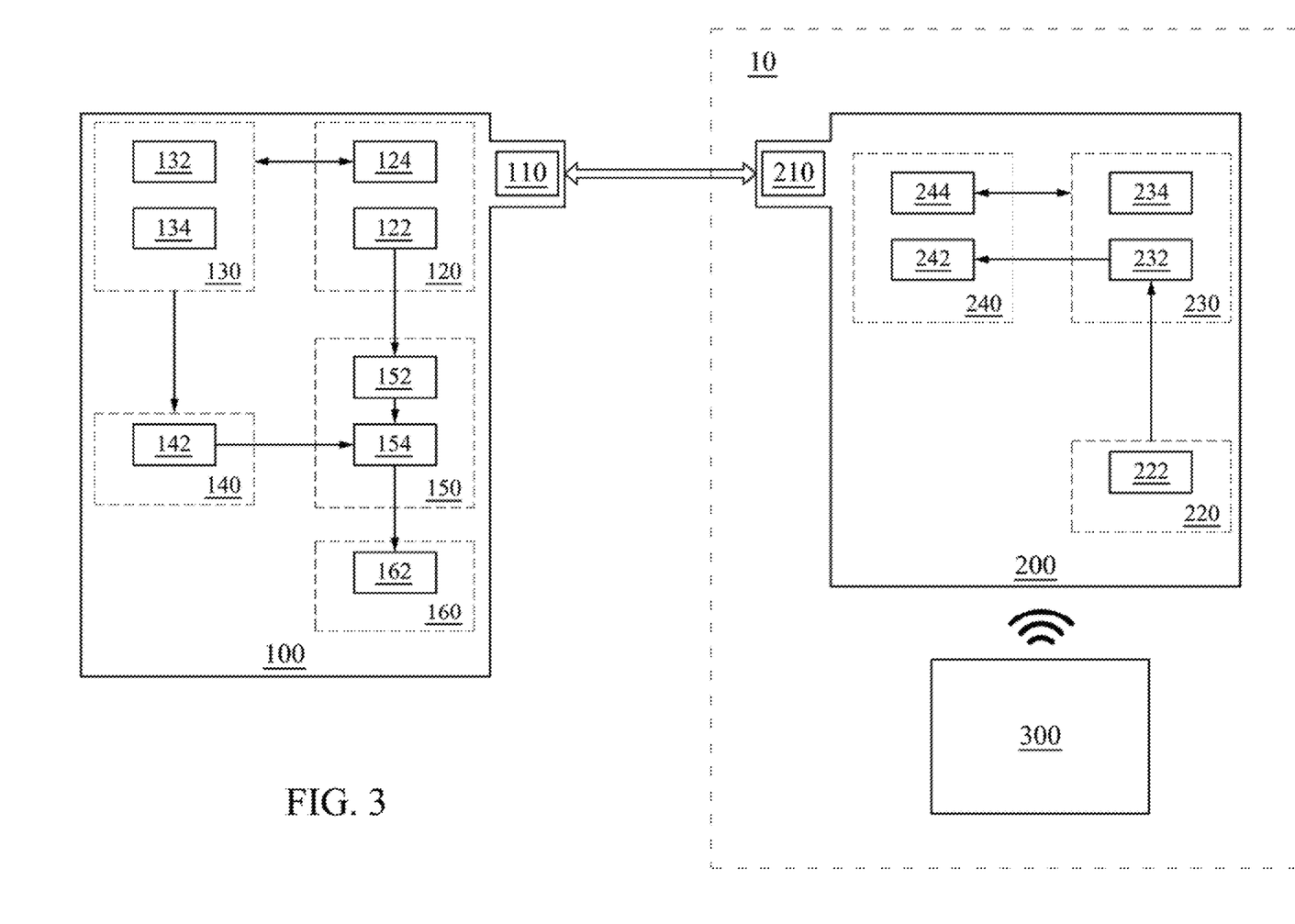
FIG. 3 illustrates a detailed system block diagram of a system corresponding to a setup method of a display device according to some embodiments of the present invention.

FIG. 3 illustrates a detailed system block diagram of the system 10 corresponding to the setup method of the display device 100 according to some embodiments of the present invention. As shown in FIG. 3, the smart device 200 includes the connector 210, an input/output (I/O) interface controller 220, a processing circuit 230, and an output circuit 240. The I/O interface controller 220 includes an interface circuit 222. The processing circuit 230 includes a processor 232 and memory 234. The output circuit 240 includes an audio-video output interface circuit 242 and a Monitor Control Command Set (MCCS) circuit 244 (hereinafter referred to as the MCCS command circuit 244). The interface circuit 222 is used to enable the smart device 200 to be communicatively connected to the remote control device 300, such that the smart device 200 may receive the setting command from the remote control device 300. The processor 232 receives the setting command from the interface circuit 222 and the processor 232 is used to convert the setting command into the display setting command. The processor 232 is also used to convert digital audio-video content (received by the smart device 200 through the internet) into audio-video data. The memory 234 is used to store data related to the smart device 200, such as setting parameters and browsing history of the smart device 200. The memory 234 can also be used to store display parameter(s) (e.g., current brightness, current volume, current firmware version, etc.) of the display device 100 read by the smart device 200. The audio-video output interface circuit 242 is used to receive audio-video data from the processor 232 and to output the audio-video data to the display device 100. The MCCS command circuit 244 is used to receive display setting command from the processor 232 and to transmit the display setting command to the display device 100.

As shown in FIG. 3, the display device 100 includes an input circuit 120, a processing circuit 130, an On-Screen Display (OSD) circuit 140, an audio-video processing circuit 150, and an output circuit 160. The input circuit 120 includes an audio-video input interface circuit 122 and a MCCS command circuit 124. The processing circuit 130 includes a processor 132 and a memory 134. The On-Screen Display (OSD) circuit 140 includes an On-Screen Display (OSD) unit 142. The audio-video processing circuit 150 includes an audio-video processor 152 and a blending circuit 154. The output circuit 160 includes an audio-video output circuit 162. The audio-video input interface circuit 122 is used to receive audio-video data from the audio-video output interface circuit 242. The MCCS command circuit 124 is used to receive the display setting command from the MCCS command circuit 244. The processor 132 is used to receive the display setting command from the MCCS command circuit 124 and to perform signal processing on the display setting command. The memory 134 is used to store data related to the display device 100, such as display parameter(s). The On-Screen Display (OSD) unit 142 is used to receive the display setting command processed by the processor 132 from the processor 132 and to correspondingly adjust the parameter(s) of the display device 100 according to the display setting command processed by the processor 132. The audio-video processor 152 is used to receive audio-video data from the audio-video input interface circuit 122 and to process the audio-video data. The blending circuit 154 is used to receive the adjusted parameter(s) from the On-Screen Display (OSD) unit 142, and to receive the processed audio-video data from the audio-video processor 152, and to blend the processed audio-video data and the adjusted parameter(s) so as to generate the blended audio-video data. The audio-video output circuit 162 is used to receive the blended audio-video data from the blending circuit 154, such that the blended audio-video data can be displayed on the display screen of the display device 100 accordingly.

Figure 4:
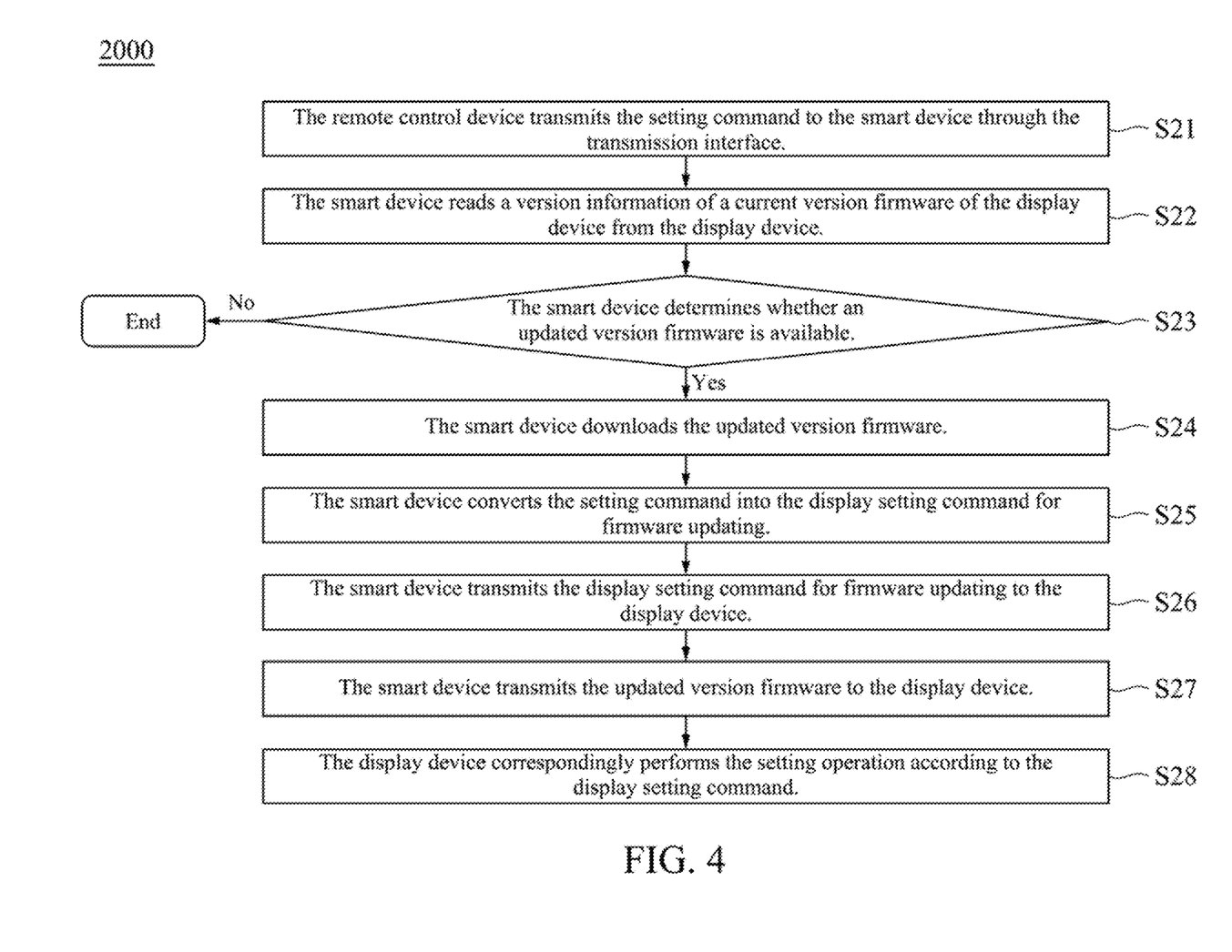
FIG. 4 illustrates a flow chart of a setup method of a display device according to a second embodiment of the present invention.

FIG. 4 illustrates a flow chart of a setup method 2000 of the display device 100 according to a second embodiment of the present invention. The setup method 2000 of the display device 100 includes steps S21-S28. In step S21, the remote control device 300 transmits the setting command to the smart device 200 through the transmission interface. The setting command in the step S21 is related to firmware updating of the display device 100. In step S22, the smart device 200 reads a version information of a current version firmware of the display device 100 from the display device 100. In step S23, the smart device 200 determines whether an updated version firmware relative to the current version firmware is available based on the version information. When the smart device 200 determines that the updated version firmware is available, step S24 is performed. When the smart device 200 determines that the updated version firmware is not available, the setup method 2000 of the display device 100 is ended. In the step S24, when the smart device 200 determines that the updated version firmware is available, the smart device 200 downloads the updated version firmware. In step S25, the smart device 200 converts the setting command into the display setting command for firmware updating. In step S26, the smart device 200 transmits the display setting command for firmware updating to the display device 100. In step S27, the smart device 200 transmits the updated version firmware to the display device 100. In step S28, the display device 100 correspondingly performs the setting operation according to the display setting command.

In the second embodiment of the present invention, each of the connector 210 of the smart device 200 and the connector 110 of the display device 100 includes the high definition multimedia interface (HDMI), and information is transmitted between the smart device 200 and the display device 100 through the Display Data Channel (DDC). Specifically, in the step S22, the smart device 200 reads the version information of the current version firmware of the display device 100 from the display device 100 through the Display Data Channel (DDC). Specifically, in the step S26, the smart device 200 transmits the display setting command (i.e., the MCCS command) for firmware updating to the display device 100 through the Display Data Channel (DDC) and in compliance with the Video Electronics Standards Association (VESA) Monitor Control Command Set (MCCS) standard. In other words, in the step S25, the smart device 200 converts the setting command into the MCCS command. Specifically, in the step S27, the smart device 200 transmits the updated version firmware to the display device 100 through the Display Data Channel (DDC).

In the second embodiment of the present invention, in the step S23, the smart device 200 is communicatively connected to a server that provides firmware through the internet, such that the smart device 200 determines whether the updated version firmware is available. The aforementioned server that provides firmware may be a remote control server, such as an Over-The-Air (OTA) server, or a local server. In the second embodiment of the present invention, in the step S24, when the smart device 200 determines that the updated version firmware is available, the smart device 200 downloads the updated version firmware from the aforementioned server, such as an Over-The-Air (OTA) server.

In the second embodiment of the present invention, in the step S28, the display device 100 correspondingly performs the firmware updating operation according to the display setting command. In general, the firmware updating for the traditional display device needs to utilize the USB port of the traditional display device and to utilize the hardware buttons to operate On-Screen Display (OSD) menu on the display screen of the traditional display device, thereby performing firmware updating. However, if the traditional display device does not have a reserved USB port, the traditional display device can only be sent to the repair center of manufacturer, such that the engineer of manufacturer performs firmware updating. In contrast, by utilizing the setup method 2000 of the second embodiment of the present invention, the user does not need to use any hardware buttons or to operate On-Screen Display (OSD) menu on the display screen of the display device 100 to perform firmware updating, which facilitates the users to update the firmware of the display device 100 by themselves. On the other hand, by utilizing the setup method 2000 of the second embodiment of the present invention, the display device 100 does not need hardware buttons to be configured thereon, thereby reducing the production cost of the display device 100.

Figure 5:
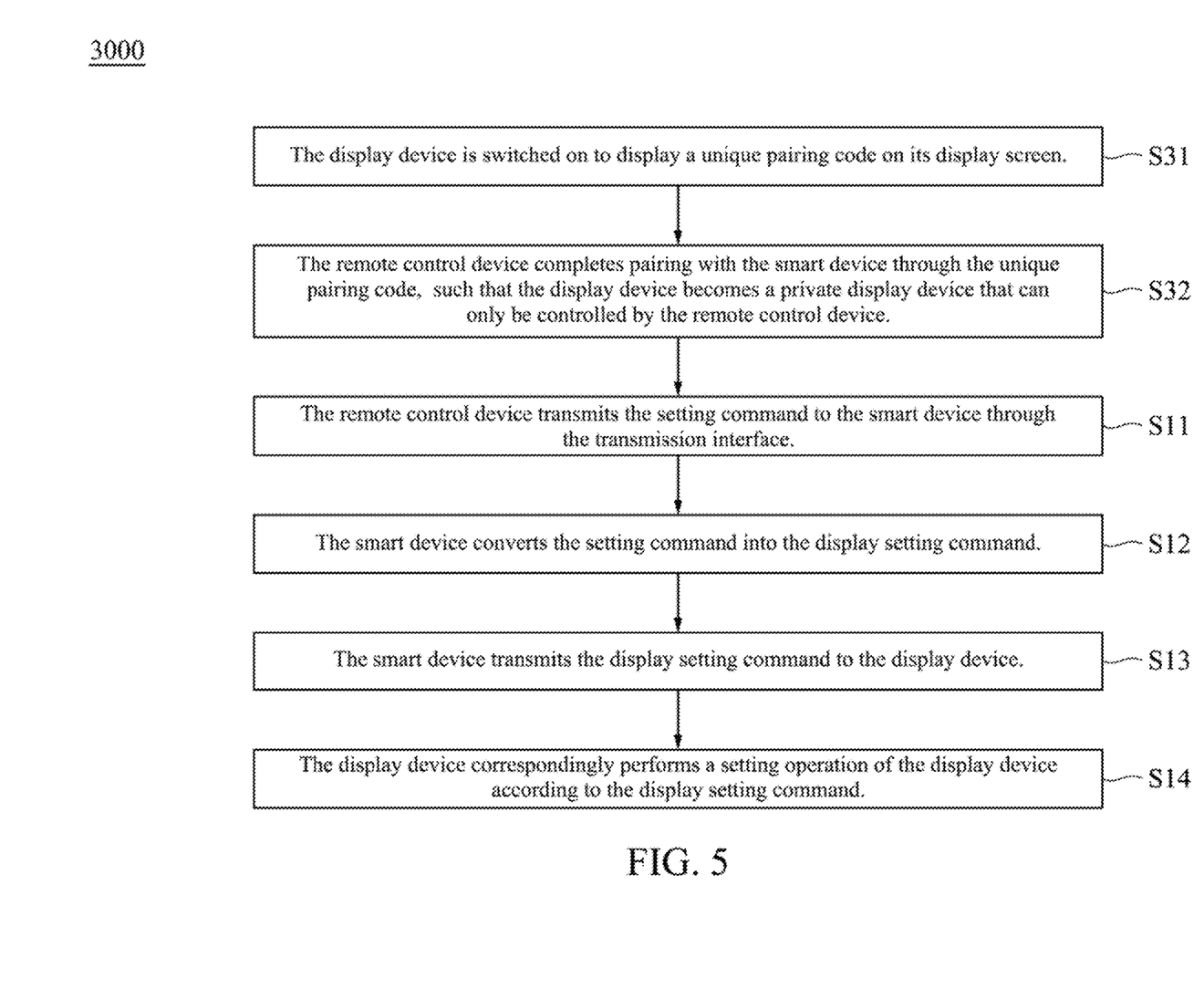
FIG. 5 illustrates a flow chart of a setup method of a display device according to a third embodiment of the present invention.

In some embodiments of the present invention, before the step S11 of the setup method 1000 of the first embodiment of the present invention and before the step S21 of the setup method 2000 of the second embodiment of the present invention, the remote control device 300 completes pairing with the smart device 200 through the display device 100, such that the display device 100 becomes a private display device that can only be controlled by the remote control device 300. The following FIG. 5 is used as an example to add steps S31 and S32 before the step S11 of the setup method 1000 of the first embodiment of the present invention. FIG. 5 illustrates a flow chart of a setup method 3000 of the display device 100 according to a third embodiment of the present invention. In the step S31, the display device 100 is switched on, such that the display device 100 displays a unique pairing code on the display screen of the display device 100. The aforementioned unique pairing code may be, for example, a two-dimensional (2D) barcode (such as a QR code, a PDF417 code, etc.), a one-dimensional (1D) barcode, a string of character codes, or a pairing name, etc. In the step S32, the remote control device 300 completes pairing with the smart device 200 through the unique pairing code displayed on the display screen of the display device 100 (for example, the remote control device 300 scans or keys in the unique pairing code, etc.), such that the display device 100 becomes a private display device that can only be controlled by the remote control device 300.

Specifically, in the third embodiment of the present invention, after the remote control device 300 has been paired with the smart device 200, other control device(s) other than the remote control device 300 can no longer be paired with the smart device 200 and cannot control the display device 100 to perform the setting operation through the smart device 200. In general, traditional digital video converting box with networking function is not limited to be paired with only one remote control device. As a result, any remote control device can be paired with the traditional digital video converting box, and thus privacy of the user of the traditional digital video converting box cannot be protected. For example, any remote control device can view the browsing history of the traditional digital video converting box through the display device. In contrast, in the third embodiment of the present invention, a unique pairing code is set, and the display device 100 cannot be controlled through the smart device 200 to perform the setting operation without using a specific remote controller (i.e., the remote control device 300), and thus the relevant data (e.g., the browsing history) of the smart device 200 cannot be viewed through the display device 100.

In the third embodiment of the present invention, the display device 100 becomes a private display that can only be controlled by the remote control device 300. When other control device(s) other than the remote control device 300 would like to be paired with the smart device 200 or would like to control the display device 100 to perform the setting operation through the smart device 200, the smart device 200 transmits a display setting command to the display device 100, thereby switching the input signal source of the display device 100. Specifically, the smart device 200 transmits the display setting command (i.e., the MCCS command) to the display device 100 through the Display Data Channel (DDC) and in compliance with the Video Electronics Standards Association (VESA) Monitor Control Command Set (MCCS) standard, such that the input signal source of the display device 100 to be switched to other external device other than the smart device 200, such as external device that is physically connected to other connector (not shown in the figure, including, for example, an HDMI interface, a DP interface, a VGA interface, a USB-C interface, etc.) of the display device 100 that is different from the connector 110. As a result, any remote control device can no longer control the display device 100 to perform the setting operation through the smart device 200, such that the display device 100 becomes a private display device that can only be controlled by the remote control device 300.

In addition, in the third embodiment of the present invention, the display device 100 becomes a private display device that can only be controlled by the remote control device 300, when other control device other than the remote control device 300 would to be paired with the smart device 200 or would like to control the display device 100 to perform the setting operation through the smart device 200, in addition to the aforementioned switching of the input signal source of the display device 100, the smart device 200 can also transmit the MCCS command to the display device 100 to control the display device 100 from being controlled by other control device(s). For example, the display device 100 is controlled to dim the brightness of the display screen of the display device 100. For example, the display device 100 is controlled to reduce the display resolution of the display screen of the display device 100. For example, the display device 100 is controlled so that the display screen of the display device 100 does not display images. For example, the display device 100 is controlled so that the physical buttons on the display device 100 cannot be operated.

Specifically, the display device 100 becomes a private display device that can only be controlled by the remote control device 300, when other control device other than the remote control device 300 would to be paired with the smart device 200 or would like to control the display device 100 to perform the setting operation through the smart device 200, the smart device 200 transmits display setting command to the display device 100 through the Display Data Channel (DDC) and in compliance with the Video Electronics Standards Association (VESA) Monitor Control Command Set (MCCS) standard, and thus the display device 100 is locked from being controlled by other control device(s). When the display device 100 is locked, the locked display device 100 can only be unlocked by an authorized unit through the network or by resetting the smart device 200. However, even if the smart device 200 is reset, the content of the smart device 200 cannot be forcibly obtained.

Figure 6:
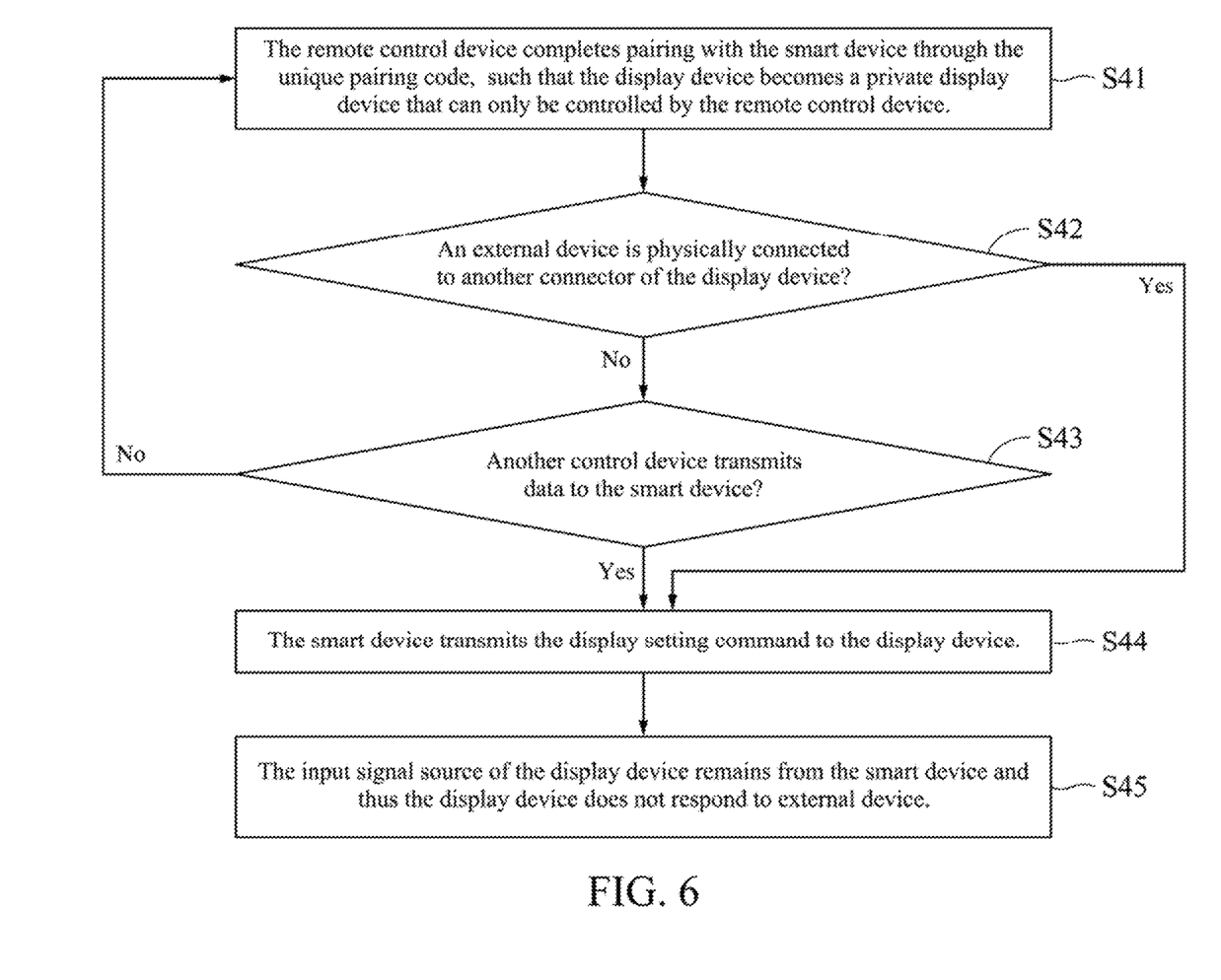
FIG. 6 illustrates a flow chart for protecting a private display device according to the third embodiment of the present invention.

FIG. 6 illustrates a flow chart for protecting a private display device according to the third embodiment of the present invention. In step S41, the remote control device 300 completes pairing with the smart device 200 through the display device 100, such that the display device 100 becomes a private display device that can only be controlled by the remote control device 300. In step S42, the smart device 200 determines whether there is an external device physically connected to another connector (other than the connector 110) of the display device 100. If the smart device 200 determines that the external device is physically connected to another connector of the display device 100, step S44 is performed. If the smart device 200 determines that there is no external device is physically connected to another connector of the display device 100, step S43 is performed. In the step S43, the smart device 200 determines whether there is another control device (other than the remote control device 300) transmits data to the smart device 200 for controlling the display device 100 to perform the setting operation. If the smart device 200 determines that another control device transmits data to the smart device 200, the step S44 is performed. If the smart device 200 determines that there is no another control device transmits data to the smart device 200, returning to step S41. In the step S44, the smart device 200 transmits the display setting command to the display device 100 through the Display Data Channel (DDC) and in compliance with the Video Electronics Standards Association (VESA) Monitor Control Command Set (MCCS) standard. In step S45, the input signal source of the display device 100 remains from the smart device 200 and thus the display device 100 does not respond to external device physically connected to other connector of the display device 100, thereby protecting the display device 100 from being controlled by the external device.

Figure 7:
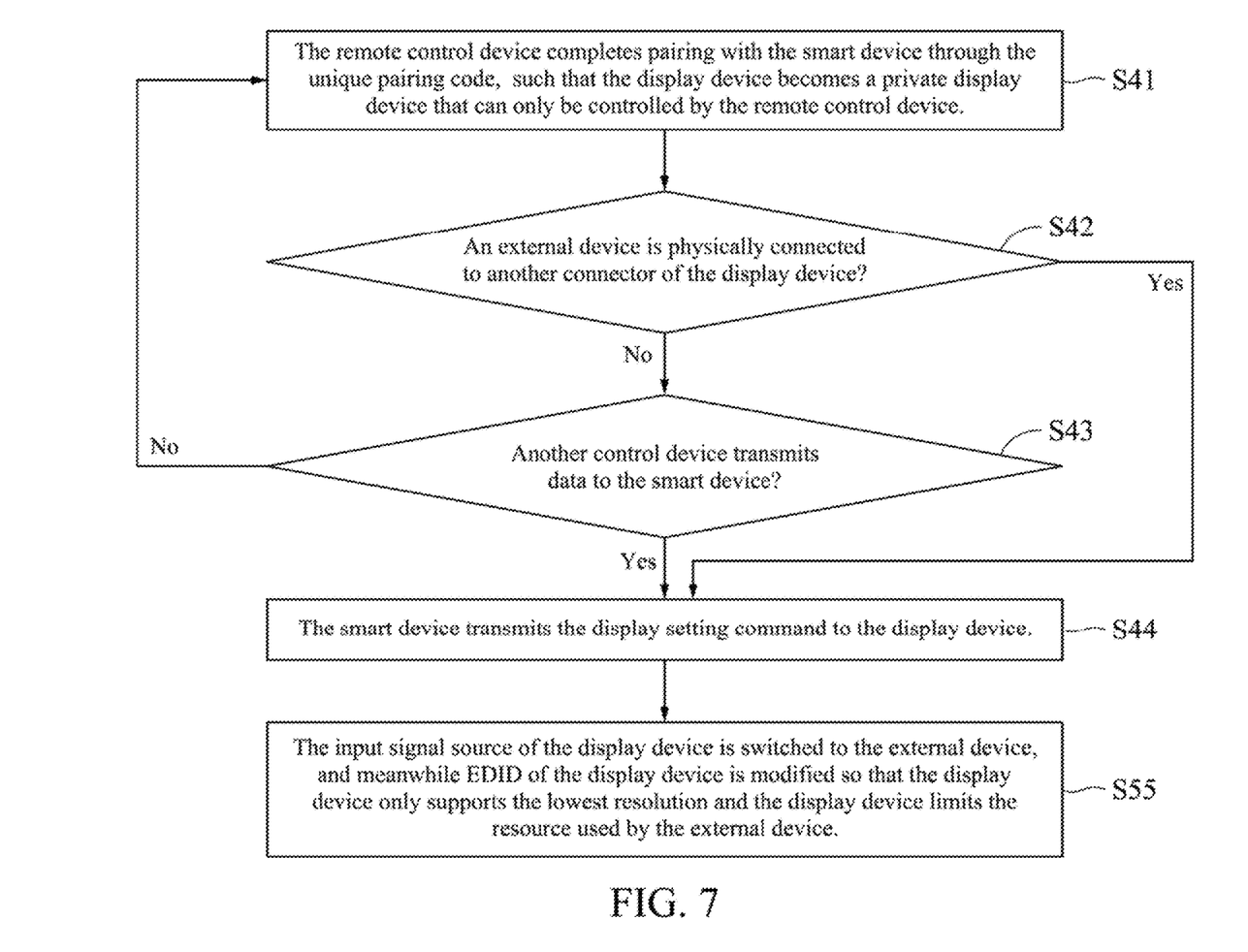
FIG. 7 illustrates a flow chart for protecting a private display device according to the third embodiment of the present invention.

FIG. 7 illustrates a flow chart for protecting a private display device according to the third embodiment of the present invention. FIG. 7 is similar to FIG. 6, except that the step S45 in FIG. 6 is replaced with step S55 in FIG. 7. In step S55, the input signal source of the display device 100 is switched to the external device, and meanwhile Extended Display Identification Data (EDID) of the display device 100 is modified so that the display device 100 only supports the lowest resolution and the display device 100 limits the resource used by the external device, thereby protecting the display device 100 from being easily controlled by the external device.

From the above description, the present invention provides the setup method of the display device which allows users to update firmware of the display device by themselves through the smart device without using any physical buttons or on-screen settings menu (OSD) menu of the display device, improving user convenience in operation. In addition, the display setting method proposed by the present invention also allows the user to adjust the display parameters of the display through the smart device without using any physical buttons of the display device or utilizing On-Screen Display (OSD) menu of the display device, thereby improving the user's operation efficiency. Further, the setup method of the display device proposed by the present invention allows the display device does not need to manufacture hardware buttons on the display screen of the display device, thereby reducing the production cost of the display device. Finally, the setup method of the display device proposed by the present invention makes the display device become a private display device that can only be controlled by only one remote control device. If this only one remote control device is not utilized, the display device cannot be controlled by the smart device to perform the setting operation and the relevant data of the smart device cannot be viewed through the display device, thereby protecting the display device from being controlled by external device.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A setup method of a display device, comprising:
   transmitting, by a remote control device, a setting command to a smart device through a transmission interface;
   converting, by the smart device, the setting command into a display setting command, wherein the display setting command is used for firmware updating;
   reading, by the smart device, a version information of a current version firmware of the display device from the display device after the remote control device transmits the setting command to the smart device;
   determining, by the smart device, whether an updated version firmware relative to the current version firmware is available based on the version information;
   downloading, by the smart device, the updated version firmware when the smart device determines that the updated version firmware is available;
   transmitting, by the smart device, the display setting command and the updated version firmware to the display device, wherein a first connector of the smart device is physically connected to a second connector of the display device; and
   correspondingly performing, by the display device, a firmware update operation of the display device according to the display setting command and the updated version firmware;
   wherein the remote control device completes pairing with the smart device through the display device by the following steps:
   switching on the display device, before the remote control device transmits the setting command, such that the display device displays a unique pairing code on a display screen of the display device; and
   completing, by the remote control device, pairing with the smart device through the unique pairing code.

2. The setup method of the display device of claim 1, wherein each of the first connector and the second connector includes a high definition multimedia interface (HDMI), wherein the smart device transmits the display setting command to the display device through a Display Data Channel (DDC).

3. The setup method of the display device of claim 1, wherein the smart device transmits the display setting command to the display device in compliance with a Video Electronics Standards Association (VESA) Monitor Control Command Set (MCCS) standard.

4. The setup method of the display device of claim 1, wherein the smart device is communicatively connected to a server through the internet and the smart device downloads the updated version firmware from the server.

5. The setup method of the display device of claim 1, wherein the smart device reads the version information of the current version firmware of the display device from the display device through a Display Data Channel (DDC).

6. The setup method of the display device of claim 1, wherein the smart device transmits the display setting command for firmware updating to the display device through a Display Data Channel (DDC) and in compliance with a Video Electronics Standards Association (VESA) Monitor Control Command Set (MCCS) standard.

7. The setup method of the display device of claim 1, wherein the smart device transmits the updated version firmware to the display device through a Display Data Channel (DDC).

8. A setup method of a display device, comprising:
transmitting, by a remote control device, a setting command to a smart device through a transmission interface;
converting, by the smart device, the setting command into a display setting command;
transmitting, by the smart device, the display setting command to the display device, wherein a first connector of the smart device is physically connected to a second connector of the display device; and
correspondingly adjusting, by the display device, at least one parameter of the display device according to the display setting command;
wherein the smart device is a set-top box (STB);
wherein the remote control device completes pairing with the smart device through the display device by the following steps:
switching on the display device, before the remote control device transmits the setting command, such that the display device displays a unique pairing code on a display screen of the display device; and
completing, by the remote control device, pairing with the smart device through the unique pairing code.

9. The setup method of the display device of claim 8, wherein each of the first connector and the second connector includes a high definition multimedia interface (HDMI), wherein the smart device transmits the display setting command to the display device through a Display Data Channel (DDC).

10. The setup method of the display device of claim 8, wherein the smart device transmits the display setting command to the display device in compliance with a Video Electronics Standards Association (VESA) Monitor Control Command Set (MCCS) standard.

11. The setup method of the display device of claim 8, wherein the remote control device is a mouse, a keyboard, a smart phone or a wireless remote controller, wherein the transmission interface is a Bluetooth interface, an infrared transmission interface, a universal serial bus (USB) interface or a wireless local area network (WLAN) interface.

12. A setup method of a display device, comprising:
transmitting, by a remote control device, a setting command to a smart device through a transmission interface;
converting, by the smart device, the setting command into a display setting command;
transmitting, by the smart device, the display setting command to the display device, wherein a first connector of the smart device is physically connected to a second connector of the display device; and
correspondingly performing, by the display device, a setting operation of the display device according to the display setting command;
wherein the remote control device completes pairing with the smart device through the display device, before the remote control device transmits the setting command, such that the display device becomes a private display device that can only be controlled by the remote control device;
wherein the remote control device completes pairing with the smart device through the display device by the following steps:
switching on the display device, before the remote control device transmits the setting command, such that the display device displays a unique pairing code on a display screen of the display device; and
completing, by the remote control device, pairing with the smart device through the unique pairing code.

13. The setup method of the display device of claim 12, further comprising:
transmitting, by the smart device, the display setting command to the display device, when other control devices other than the remote control device would like to pair with the smart device or would like to control the display device to perform the setting operation through the smart device, thereby switching an input signal source of the display device.

14. The setup method of the display device of claim 13, wherein the smart device transmits the display setting command to the display device through a Display Data Channel (DDC) and in compliance with a Video Electronics Standards Association (VESA) Monitor Control Command Set (MCCS) standard, such that the input signal source of the display device is switched and thus the input signal source of the display device corresponds to an external device physically connected to a third connector of the display device.

15. The setup method of the display device of claim 12, wherein when an external device is physically connected to a third connector of the display device, the smart device transmits the display setting command to the display device, thereby maintaining an input signal source of the display device so that the input signal source of the display device corresponds to the smart device.

16. The setup method of the display device of claim 15, wherein the smart device transmits the display setting command to the display device through a Display Data Channel (DDC) and in compliance with a Video Electronics Standards Association (VESA) Monitor Control Command Set (MCCS) standard, such that the input signal source of the display device remains from the smart device and thus the display device does not respond to the external device.

17. The setup method of the display device of claim 12, wherein when an external device is physically connected to a third connector of the display device, the smart device transmits the display setting command to the display device, thereby switching an input signal source of the display device to the external device and meanwhile modifying Extended Display Identification Data (EDID) of the display device so that the display device only supports the lowest resolution.

18. The setup method of the display device of claim 17, wherein the smart device transmits the display setting command to the display device through a Display Data Channel (DDC) and in compliance with a Video Electronics Standards Association (VESA) Monitor Control Command Set (MCCS) standard, thereby switching the input signal source of the display device to the external device and meanwhile modifying Extended Display Identification Data (EDID) of the display device so that the display device only supports the lowest resolution and limiting resource, of display device, used by the external device.

* * * * *